United States Patent
Gupta et al.

(10) Patent No.: US 8,212,855 B2
(45) Date of Patent: Jul. 3, 2012

(54) VIDEO CONFERENCING EYEWEAR

(75) Inventors: Shekhar Gupta, Overland Park, KS (US); Mike A. Roberts, Overland Park, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 627 days.

(21) Appl. No.: 12/431,900

(22) Filed: Apr. 29, 2009

(65) Prior Publication Data

US 2010/0277563 A1 Nov. 4, 2010

(51) Int. Cl.
*H04N 7/14* (2006.01)
(52) U.S. Cl. ............... 348/14.08; 348/14.01; 348/14.12
(58) Field of Classification Search .... 348/14.01–14.16; 359/618, 630; 345/8; 351/50, 123, 158
See application file for complete search history.

(56) References Cited

U.S. PATENT DOCUMENTS

| | | |
|---|---|---|
| 5,151,722 A | 9/1992 | Massof et al. |
| 5,281,957 A | 1/1994 | Schoolman |
| 5,825,340 A | 10/1998 | Torizuka et al. |
| 5,886,822 A | 3/1999 | Spitzer |
| 6,091,546 A * | 7/2000 | Spitzer ........................ 359/618 |
| 6,349,001 B1 | 2/2002 | Spitzer |
| 2006/0248144 A1* | 11/2006 | Zhu et al. ...................... 709/205 |
| 2008/0198324 A1* | 8/2008 | Fuziak ........................... 351/158 |
| 2009/0049504 A1* | 2/2009 | Lu ................................... 725/141 |
| 2010/0220172 A1* | 9/2010 | Michaelis ................... 348/14.08 |

OTHER PUBLICATIONS

Qingbar GP300 Wireless Video Glasses, Nov. 26, 2007, http://blog.tmcnet.com/blog/tom-keating/gadgets/qingbar-gp300-wireless-video-glasses.asp.
The Future of Things, nVIDIA 3D Gaming Glasses, Feb. 2, 2009, http://thefutureofthings.com/news/6333/nvidia-3d-gaming-glasses.html.
DIYTrade, Feb. 20, 2009, http://www.diytrade.com/china/4/products-list/0-k-c-1/video_glasses.html.

* cited by examiner

Primary Examiner — Melur Ramakrishnaiah
(74) Attorney, Agent, or Firm — Patton Boggs LLP

(57) ABSTRACT

Embodiments of the disclosed invention include an apparatus, method, and computer program product for enabling a user to participate in a videoconference. For example, in one embodiment, a video conferencing eyewear apparatus that includes a network interface for receiving a data stream from a video conference server, the data stream including a video and audio associated with a first party, and a shared presentation. In addition, the video conferencing eyewear apparatus includes a data storage component that stores computer executable instructions; and a processor that executes the computer executable instructions to display the video on a first display of the video conferencing eyewear apparatus; display the shared presentation on a second display of the video conferencing eyewear apparatus; and output the audio to an audio output component of video conferencing eyewear apparatus.

18 Claims, 4 Drawing Sheets

VIDEO CONFERENCING EYEWEAR

BACKGROUND OF THE INVENTION

The disclosed invention is related to the field of video conferencing. Video conferencing uses telecommunications of audio and video to bring people at different sites together for a meeting. This can be as simple as a conversation between two people in private offices (point-to-point) or involve several sites (multi-point) with more than one person in large rooms at different sites. Besides the audio and visual transmission of meeting activities, videoconferencing can be used to share documents, computer-displayed information, and whiteboards.

SUMMARY

Embodiments of the disclosed invention include an apparatus, method, and computer program product for providing video conferencing. For example, in one embodiment, a video conferencing eyewear apparatus is disclosed that is configured to enable a user to participate in a videoconference with one or more remote parties. In accordance with one embodiment, the video conferencing eyewear apparatus may include a network interface for receiving a data stream from a video conference server, the data stream including video and audio associated with a first party, and a shared presentation. Additionally, the video conferencing eyewear apparatus may include a video processor for displaying the video on a first display of the eyewear and for displaying the shared presentation on a second display of the eyewear. Further, the video conferencing eyewear may include an audio processor for outputting the incoming audio to a pair of speakers.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed invention is related to the field of video conferencing. In particular, the disclosed embodiments provide an apparatus, method, and computer program product for enabling a user to use a single hands-free compact mobile device to participate in a videoconference. For instance, embodiments of the disclosed invention include a video conferencing eyewear apparatus that is self-contained for enabling a user to participate in a videoconference. For example, as will be further described, in accordance with one embodiment, the video conferencing eyewear apparatus may include all the necessary hardware and software for directly communicating with one or more remote parties and/or with a videoconference server for participating in a video conference call. In addition, in some embodiments, the video conferencing eyewear apparatus may include hardware and/or software elements for presenting and editing a shared presentation/document between the user and one or more remote parties.

The disclosed embodiments and advantages thereof are best understood by referring to FIGS. 1-4 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
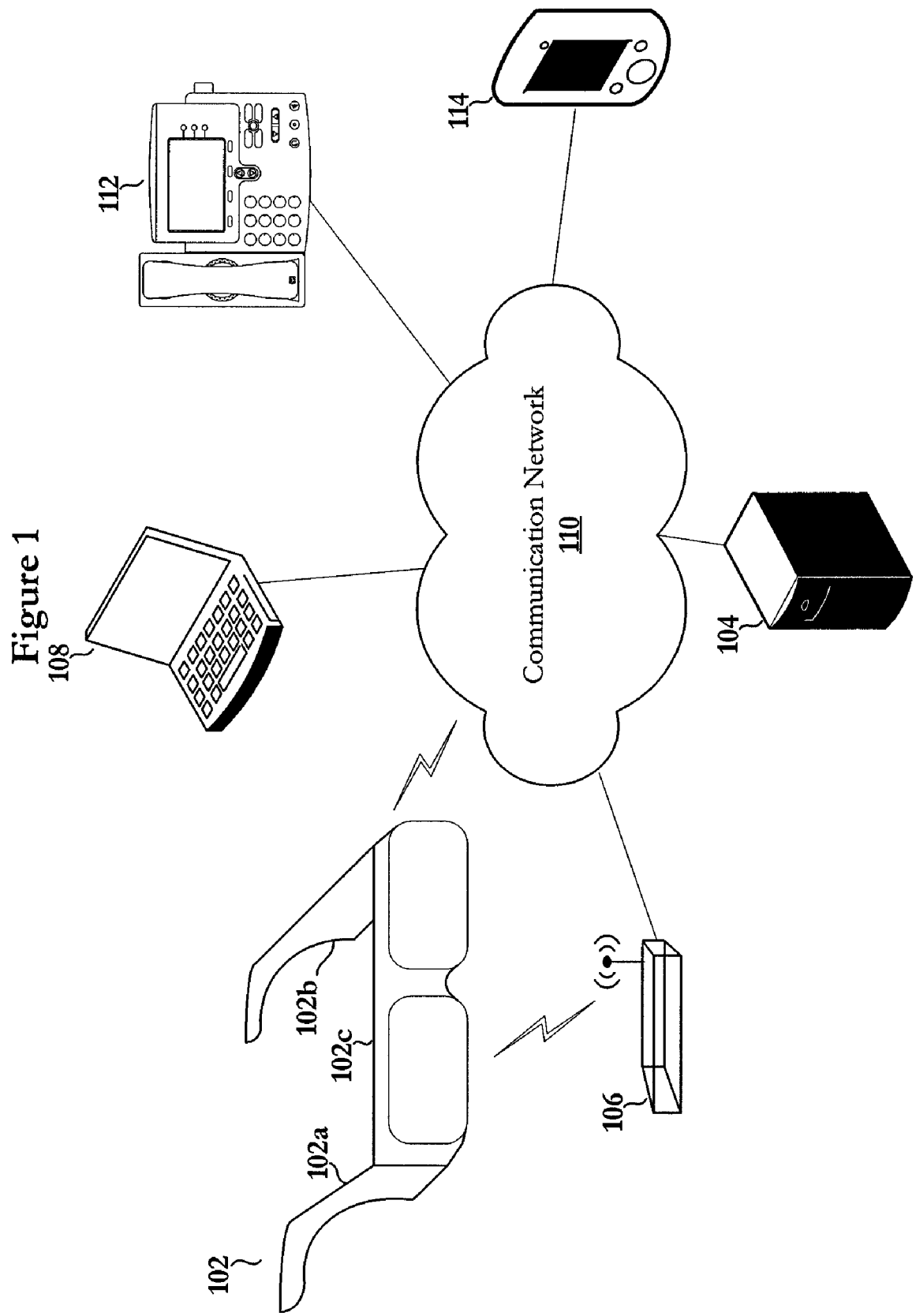
FIG. 1 depicts an embodiment of a network environment in which the illustrative embodiments may be implemented.

FIG. 1 depicts an embodiment of a network environment 100 in which the illustrative embodiments may be implemented. In the depicted embodiment, a video conferencing eyewear apparatus 102 may be utilized to participate in a videoconference with one or more remote conference calling parties. In one embodiment, video conferencing eyewear apparatus 102 may be constructed to resemble a normal pair of eyeglasses and/or sunglasses. For instance, as will be further described, video conferencing eyewear apparatus 102 may include a pair of temple arms 102*a* and 102*b*, and a display enclosure 102*c* for housing one or more display units and other components of video conferencing eyewear apparatus 102, such as, but not limited to, a wireless transceiver for sending and receiving video, audio, and other types of data. For example, in one embodiment, video conferencing eyewear apparatus 102 may communicate with a videoconference server 104, via communication network 110, to participate in a video conference call with one or more remote parties. As will be further described, in some embodiments, video conferencing eyewear apparatus 102 may communicate directly with communication network 110, e.g., through a 3G network. Alternatively, or in addition to, in some embodiments, video conferencing eyewear apparatus 102 may communicate through a personal computer, integrated access device, or wireless access point/router 106 for accessing communication network 110.

In one embodiment, communication network 110 may include one or more data networks, such as, but not limited to, the Internet, for routing communications between one or more communication devices and/or data processing systems. The Internet is a global system of interconnected computer networks that interchange data using the standardized Internet Protocol Suite (TCP/IP). Additionally, communication network 110 may include other types of data networks, such as, but not limited to, an intranet, a private local area network (LAN), a wide area network (IAN), and a wireless local area network (WLAN).

In addition, in some embodiments, communication network 110 may include one or more wired or wireless phone networks. For example, communication network 110 may include a public switched telephone network (PSTN). The public switched telephone network is the standard analog telephone network utilized by most homes. In addition, in some embodiments, communication network 110 may also include digital telephone networks, such as, but not limited to, an integrated services digital network (ISDN) and a fiber distributed data interface (FDDI) network. Additionally, in some embodiments, communication network 110 may include one or more cellular networks, such as, but not limited to, a Global System for Mobile Communications (GSM)

network, a Code-Division Multiple Access (CDMA) network, an Enhanced Data GSM Environment (EDGE) network, and a 3G/4G network.

In one embodiment, videoconference server 104, also known as a conference bridge or a Multipoint Control Unit (MCU) may be used to interconnect calls from several sources. For instance, in some embodiments, a videoconference server 104 may be configured to connect video conferencing eyewear apparatus 102 with a plurality of different types of devices, such as, but not limited to, a computer 108, a video phone 112, a mobile device 114, and/or a video/audio projection unit (not depicted) for enabling video conferencing. In one embodiment, videoconference server 104 includes a multipoint controller (MC) for controlling the data communications between the plurality of terminals/devices on a videoconference. Additionally, in some embodiments, videoconference server 104 may include one or more multipoint processors (MPs) for processing of audio, video, and/or data streams in a multipoint conference. For instance, in some embodiments, the multipoint processor may provide for the mixing, switching, or other processing of media streams under the control of the multipoint controller. In addition, in some embodiments, videoconference server 104 may include a browser based conference control interface and data management control for managing the joining and leaving of participants. Further, in some embodiments, videoconference server 104 may provide many other conference management features which includes cross media participation, ISDN based video conferencing, POTS audio participation, TCP/IP clients, web interfaces, and interfaces to real time video or audio from other sources.

Alternatively, in some embodiments, video conferencing eyewear apparatus 102 may be configured to be able to participate in a videoconferencing call with one or more remote parties without the use of videoconference server 104. For instance, in one embodiment, video conferencing eyewear apparatus 102 and other stations/devices in a multipoint videoconference may exchange video and audio between each station with no central manager. One advantage of having a decentralized multipoint videoconference is that the video and audio will generally be of higher quality because they don't have to be relayed through a central point. In addition, a user may make ad-hoc multipoint calls without any concern for the availability of videoconference server 104. However, this added convenience and quality may require an increase in network bandwidth because every station must transmit to every other station directly.

Figure 2:
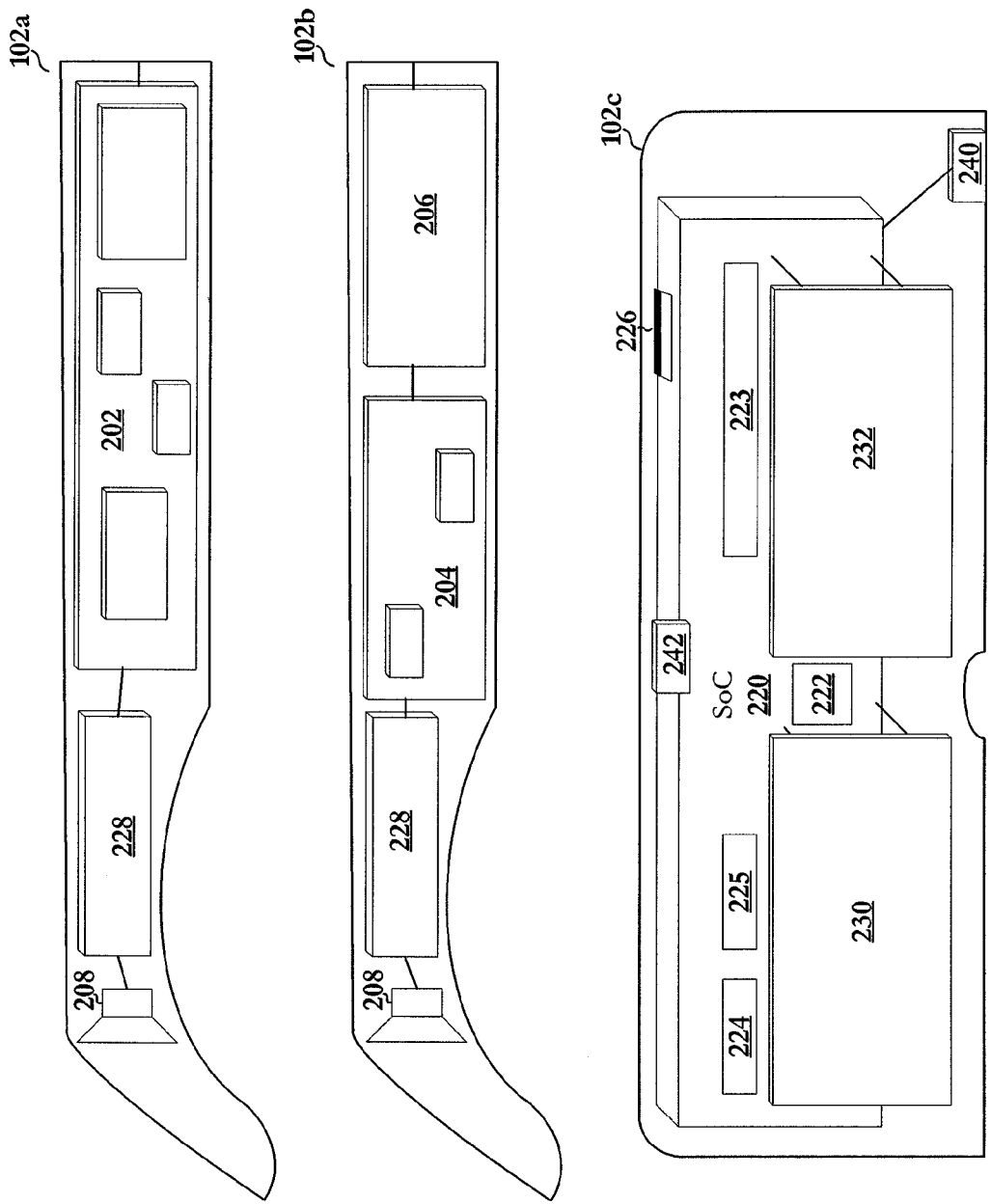
FIG. 2 depicts an embodiment of a video conferencing eyewear apparatus in accordance with the illustrative embodiments.

With reference now to FIG. 2, an example of one embodiment of video conferencing eyewear apparatus 102 is presented. In the depicted embodiment, video conferencing eyewear apparatus 102 encompasses various components housed within temple arms 102a and 102b and display enclosure 102c for enabling videoconferencing.

For example, in one embodiment, temple arms 102a and 102b may house one or more electrical components of video conferencing eyewear apparatus 102. For instance, in one embodiment, temple arm 102a may include a network interface 202, such as, but not limited to, a wireless transceiver that supports wireless networking, such as, but not limited to, WiFi/802.11 networking, for sending and receiving data via communication network 110. Additionally, in some embodiments, network interface 202 may support cellular services for enabling video conferencing eyewear apparatus 102 to communicate data via a cellular network, such as, but not limited to, a 3G network.

Additionally, in one embodiment, temple arm 102b may include a data storage medium 204, such as, but not limited to, flash memory. Flash memory is a type of electronically erasable programmable read only memory (EEPROM) that consists of a grid of electrically charged memory cells for storing data. Additionally, flash memory is ideally utilized for storing data in video conferencing eyewear apparatus 102 because flash memory provides a vast amount of data storage space in a compact space. For example, in one embodiment, data storage medium 204 may be a 40 gigabyte flash memory stick. In addition, flash memory is a solid state storage device, meaning there are no moving parts. Alternatively, video conferencing eyewear apparatus 102 may use other types of memory now known or later developed for storing data.

Additionally, in some embodiments, data storage medium 204 may store computer executable instructions associated with an operating system that is executed by one or more processing units/microprocessors of video conferencing eyewear apparatus 102. The operating system may include instructions for managing and coordinating the data flow between the different components of video conferencing eyewear apparatus 102. In addition, the operating system may act as a host for applications that are executed on video conferencing eyewear apparatus 102. For example, in one embodiment, video conferencing eyewear apparatus 102 may execute a videoconferencing software application that includes instructions for the placement of particular video images associated with one or more videoconferencing parties on one or more display units of video conferencing eyewear apparatus 102. Additionally, in some embodiments, video conferencing eyewear apparatus 102 may execute instructions for recording and storing a videoconference on data storage medium 204 for later playback. Further, in some embodiments, data storage medium 204 may include computer executable instructions associated with a whiteboard application for enabling the sharing of documents, presentations, and remote desktops between the videoconferencing parties.

In addition, in one embodiment, temple arm 102b may include a built-in mouse component, such as, but not limited to, a touchpad element 206, that is configured to enable a user to maneuver a mouse pointer about one or more display units of video conferencing, eyewear apparatus 102. In some embodiments, touchpad element 206 may also enable user input, e.g., by tapping touchpad element 206 to select a displayed menu item. Additionally, in some embodiments, touchpad element 206 may be utilized to select, scroll, or edit a shared document, or control a remote desktop. Alternatively, in other embodiments, video conferencing eyewear apparatus 102 may include a trackball or a track point (i.e., a mini joystick) for enabling mouse-like features on video conferencing eyewear apparatus 102.

Further, in some embodiments, temple arms 102a and 102b may include one or more audio speakers 208 for outputting audio associated with the one or more remote videoconferencing parties. Alternatively, or in addition to, in some embodiments, video conferencing eyewear apparatus 102 may output the audio to other types of audio components. For example, in some embodiments, video conferencing eyewear apparatus 102 may include an audio port for connecting a headset or earphones to video conferencing eyewear apparatus 102. Additionally, in some embodiments, temple arms 102a and 102b may include a manual volume adjuster, such as, but not limited to, a slider or a wheel-type mechanism.

In accordance with one embodiment, display enclosure 102c may encompass one or more display units and other components of video conferencing eyewear apparatus 102. For instance, in one embodiment, display enclosure 102c houses a system on a chip (SoC) 220. SoC 220 may integrate all or a majority of the components of video conferencing eyewear apparatus 102, such as, but not limited to, one or more processors 222, memory 223, (e.g., ROM, RAM, EEPROM and Flash), voltage regulators 224, and power management circuits 225, into a single integrated circuit chip.

In addition, in some embodiments, SoC 220 may include external interfaces including industry standards, such as, but not limited to, a universal serial bus (USB) interface 226. For instance, in one embodiment, universal serial bus interface 226 may be utilized to connect a USB input device, such as, but not limited to, a mouse or keyboard to video conferencing eyewear apparatus 102. In addition, in some embodiments, universal serial bus interface 226 may be utilize to connect to a portable device, such as, but not limited to, a smart phone, PDA (e.g., a Blackberry® device) or a laptop, for enabling text entry and/or for sharing a document or a remote desktop. Additionally, in some embodiments, SoC 220 may be configured to receive a video feed from a mobile device or other source, such as, a personal computer or video camera. For instance, a camera on a mobile device may be utilized to provide outgoing video images associated with a user of video conferencing eyewear apparatus 102 to other participants of a videoconference. Alternatively, or in addition to, as will be further described, video conferencing eyewear apparatus 102 may include an internal video capturing device.

Further, in some embodiments, universal serial bus interface 226 may be utilized to recharge an internal power source 228. Alternatively, in some embodiments, video conferencing eyewear apparatus 102 may include a dedicated power port for receiving a power plug to recharge power source 228. In one embodiment, power source 228 may be, but is not limited to, a rechargeable lithium-ion battery. In some embodiments, video conferencing eyewear apparatus 102 may include more than one power source 228. For example, in one embodiment, video conferencing eyewear apparatus 102 may house a power source 228 in temple arm 102a and another power source 228 in temple arm 102b.

In accordance with one embodiment, SoC 220 processes data (e.g., video, audio, and other data) received from network interface 202 for enabling a user to participate in a videoconference. For instance, in one embodiment, SoC 220 may include one or more dedicated video microprocessors for processing the video data, such as, but not limited to, combining the video feeds into a composite image and/or splitting a mixed video stream into separate images. Additionally, SoC 220 may include an audio codec (hardware, software, and/or a combination of both) for coding and decoding audio associated with the one or more videoconferencing parties. Further, as will be further described, in some embodiments, SoC 220 processes and handles the transmission of outbound audio, video, and/or other types of data coming from a user of video conferencing eyewear apparatus 102.

In addition, in one embodiment, display enclosure 102c may house one or more display units, such as, display 230 and display 232. In a preferred embodiment, display 230 and display 232 utilizes organic light emitting diode (OLED) technology for generating an image. OLED is a light emitting diode whose emissive electroluminescent layer is composed of a film of organic compounds. A significant benefit of OLED displays is that OLEDs do not require a backlight to function. Additionally, OLED displays draw far less power than other types of display technology, and therefore, can operate longer on the same charge. Because there is no need for a backlight, display 230 and display 232 can be very thin. For example, OLED displays may be as thin as 0.05 mm (thinner than paper) or thinner.

Alternatively, in other embodiments, display 230 and display 232 may utilize other technology, such as, but not limited to, liquid crystal display (LCD) technology or plasma technology for generating an image. Liquid crystal display consists of two layers of transparent polarized material. One of the layers is coated with a special polymer that holds the individual liquid crystals. Current is then passed through the individual crystals, which allow the crystals to pass or block light to create images. Because LCD crystals do not produce their own light, in some embodiments, display enclosure 102c may also house an external light source (not depicted), such as, but not limited to, a florescent bulb, for enabling the image created by display 230 and display 232 to become visible to the viewer. On the other hand, plasma technology employs the burning of phosphors to generate an image and does not require an external light source. In addition, in some embodiments, the image generated by display 230 and display 232 may be magnified (e.g., to simulate a 40 inch screen) and presented as if viewed from a distance, as disclosed in certain ones of the disclosed prior art. Furthermore, although the depicted embodiment illustrates two separate displays, in other embodiments, display 230 and display 232 may be portions of a single display.

In accordance with some embodiments, display enclosure 102c may include a microphone 240, such as, but not limited to, a bone conduction microphone or a directional air conduction audio microphone for capturing audio from a user. In one embodiment, microphone 240 may be a built-in hidden microphone. Alternatively, in other embodiments, microphone 240 may be a rigid or flexible boom microphone that extends from display enclosure 102c or any other part of video conferencing eyewear apparatus 102 and oriented in such a way as to optimally detect the sound of the user's speech. Video conferencing eyewear apparatus 102 may transmit the captured audio to a conference server and/or directly to the other participants of a videoconference. In addition, in some embodiments, video conferencing eyewear apparatus 102 may be utilize to record and store a user's personal recordings, such as, but not limited to, dictations and voice reminders for later playback.

Further, in some embodiments, display enclosure 102c may house an internal camera 242 for capturing video/images associated with a user. For example, in one embodiment, camera 242 may be used to transmit images seen by the user, such as, but not limited to, a document, a product, a view, or a mirror reflection of the user. In some embodiments, if a user chooses not to transmit a video feed using camera 242, video conferencing eyewear apparatus 102 may retrieve and transmit a still image to other participants of the videoconference, such as, but not limited to, a profile picture of the user or, in some embodiments, an avatar (i.e., a computer-generated image) representing the user.

Figure 3:
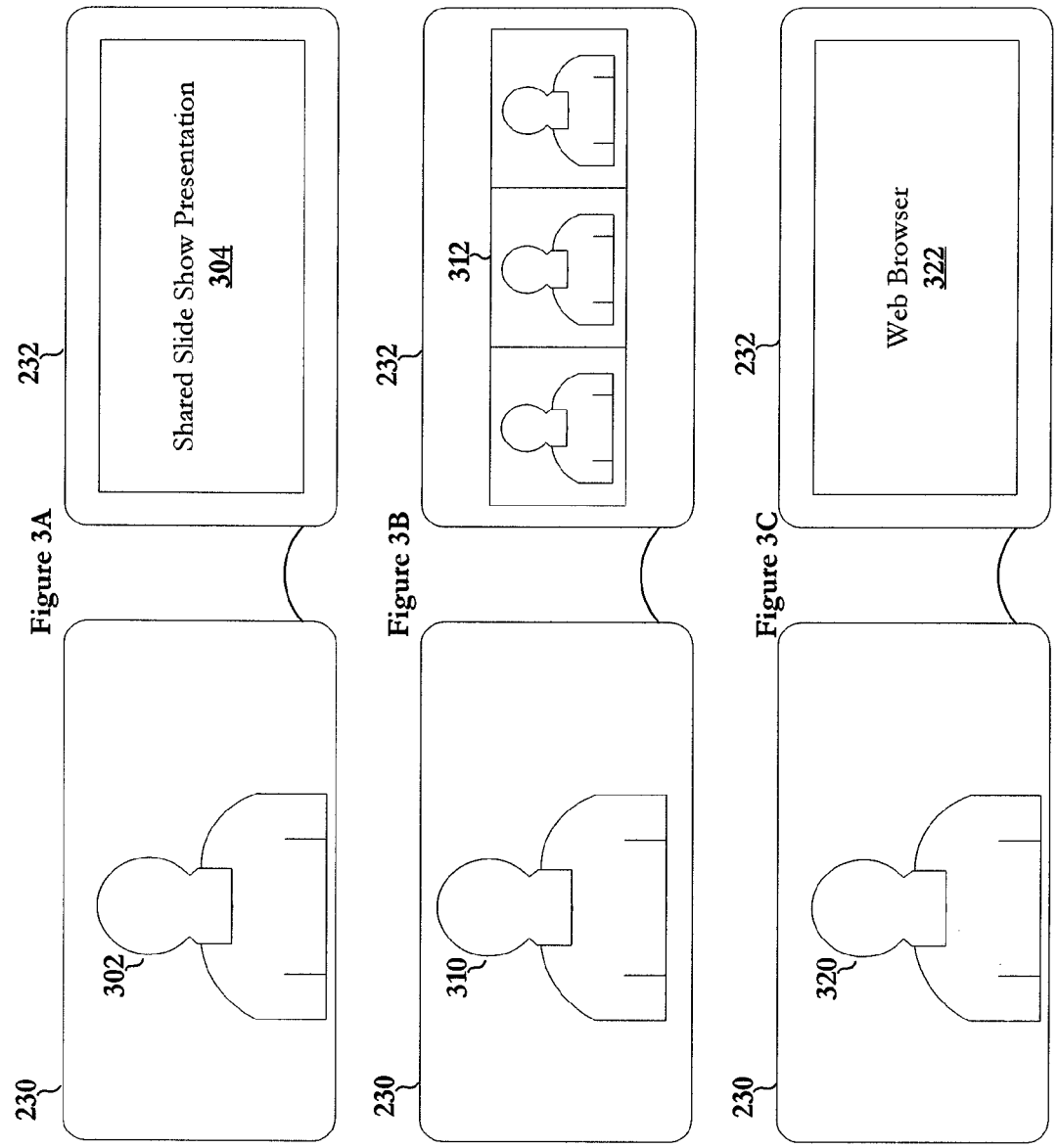
FIG. 3 illustrates different display configurations of the video conferencing eyewear apparatus in accordance with some of the disclosed embodiments.

With reference now to FIG. 3, FIGS. 3A, 3B, and 3C illustrate different display configurations in accordance with some of the disclosed embodiments. FIG. 3 is only intended as an illustration of some embodiments associated with video conferencing eyewear apparatus 102 and is not intended to limit the scope of different configurations that may apply to video conferencing eyewear apparatus 102. For example, the depicted images may be swapped from one screen to another, or, in some embodiments, video conferencing eyewear apparatus 102 may depict any combination of the illustrated screen displays.

For instance, FIG. 3A depicts an embodiment in which video conferencing eyewear apparatus 102 is configured to display a video image 302 associated with videoconferencing party on display 230 and a shared slideshow presentation 304 on display 232. In one embodiment, if a videoconference involves more than two participants, video conferencing eyewear apparatus 102 may include computer executable instructions for monitoring the audio feed to determine a currently speaking party, and display the corresponding video feed of the speaking party on display 230.

FIG. 3B depicts an embodiment in which video conferencing eyewear apparatus 102 is configured to display a currently speaking party 310 on display 230 and a composite video image of the remaining videoconferencing participants 312 on display 232. In one embodiment, a composite video image of the videoconferencing participants may be received from a video conferencing server/bridge. In these embodiments, video conferencing eyewear apparatus 102 may include computer executable instructions for separating the combined image to obtain a separate video image of currently speaking party 310 and for regenerating composite video image 312 of the remaining videoconferencing participants. Alternatively, in other embodiments, video conferencing eyewear apparatus 102 may receive video, audio, and other data directly from the other videoconferencing participants. In these embodiments, video conferencing eyewear apparatus 102 may include computer executable instructions and/or a multiplexer for combining one or more of the video feeds into a composite video image. For instance, in one embodiment, a first video signal may be converted into corresponding pixel data for display the video associated with the first video signal in a first portion of the screen and a second video signal may be converted into corresponding pixel data for display the video associated with the second video signal in a second portion of the screen. Further, in some embodiments, a panoramic view of a conference table associated with a videoconference participant may be displayed on display 230 and display 232. For example, the participants located on one side of the conference table may be displayed on display 230 and participants located on the other side of the conference table may be displayed on display 232.

FIG. 3C depicts an embodiment in which video conferencing eyewear apparatus 102 is configured to display a videoconferencing participant 320 on display 230 and display images from other sources not related to the videoconference on display 232. For example, in one embodiment, display 232 may be utilized to display a Web browser 322 for browsing the Internet. For instance, a user may desire to look up and/or need certain information during a videoconference. Alternatively, in some embodiments, a user may play a stored video file on display 232 while participating in a videoconference using only display 230. Of course, in some embodiments, video conferencing eyewear apparatus 102 may also be utilized for playing streaming and/or stored video and audio, browsing the Internet, and/or viewing and editing documents when not used for a videoconference.

Figure 4:
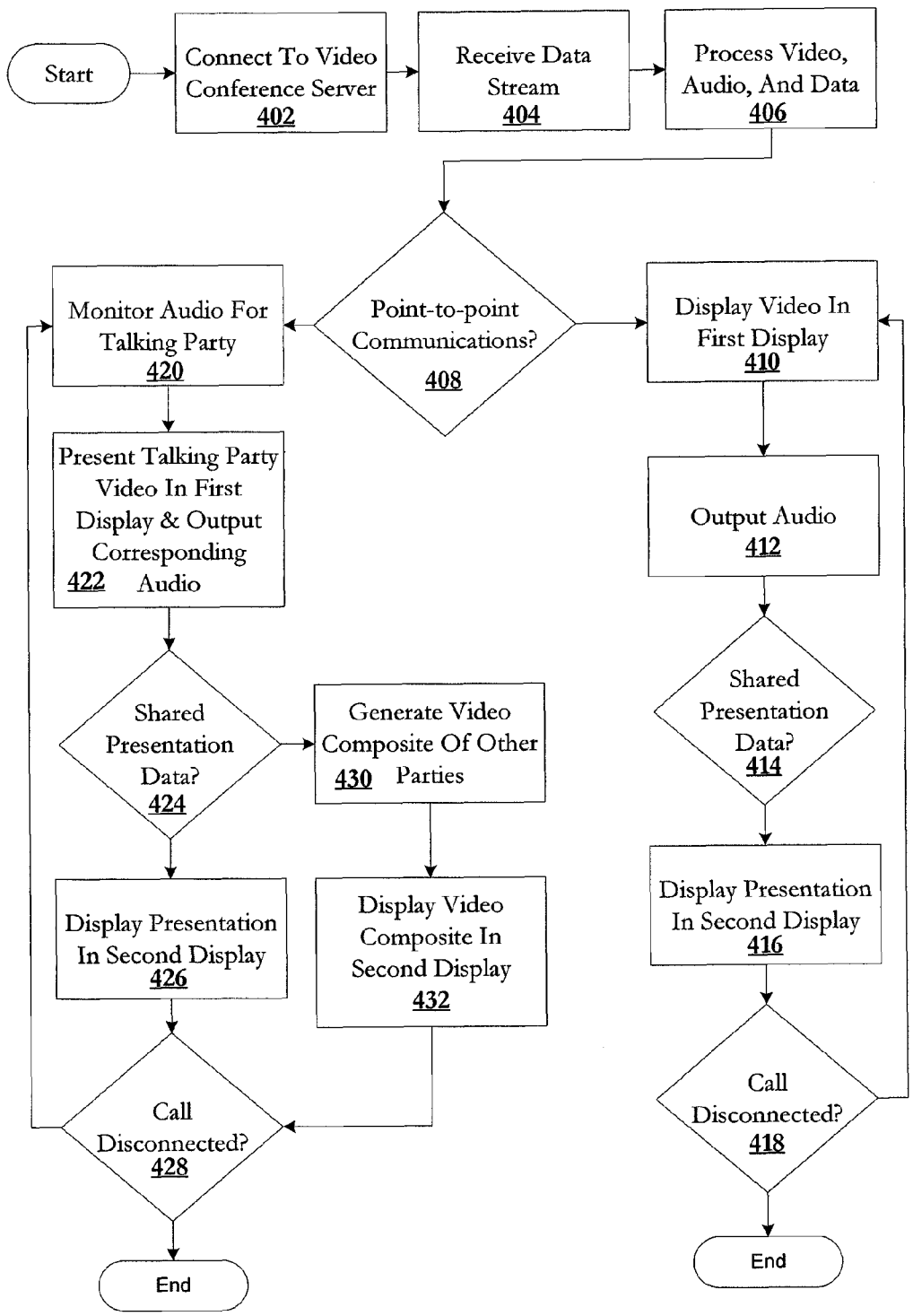
FIG. 4 depicts an embodiment of a process executed by a video conferencing eyewear apparatus for enabling a user to participate in a videoconference.

With reference now to FIG. 4, a flow diagram is presented illustrating one embodiment of a process 400 executed by video conferencing eyewear apparatus 102 to participate in a videoconference. In the depicted embodiment, process 400 begins by connecting video conferencing eyewear apparatus 102 to a videoconference server at step 402. For instance, in one embodiment, video conferencing eyewear apparatus 102 may dial or log into a prescheduled videoconference on the respective videoconference server. In other embodiments, a video conference server may transmit an e-mail message that includes a link to a participant for enabling a user to join a scheduled videoconference.

In response to connecting with the videoconference server, the process, at step 404, receives from the videoconference server one or more data streams that may include video and audio associated with one or more videoconferencing parties. In addition, in some embodiments, the data stream may include a shared presentation, such as, a document, slideshow, or remote desktop sharing. Alternatively, in other embodiments, video conferencing eyewear apparatus 102 may receive the data stream directly from one or more of the videoconferencing parties.

At step 406, the process processes the incoming data stream to extract the video, audio, and other data sent from the other participants of the videoconference. For instance, in some embodiments, the process may decompress, decrypt, and/or convert the received data. In one embodiment, the process may make a determination, at step 408, as to whether the videoconference is between two parties (i.e., point-to-point communication) or between three or more parties (i.e., point to multi-point communication). If the process determines that video conferencing eyewear apparatus 102 is on a point-to-point videoconference, the process, at step 410 displays the video associated with the other videoconference participant on a first display unit of video conferencing eyewear apparatus 102. In addition, at step 412, the process outputs the corresponding audio associated with the other videoconference participant to an audio component of video conferencing eyewear apparatus 102.

In addition, in one embodiment, the process, at step 414, may determine whether shared data is received. Shared data is defined as data that is stored at a single participant's location and/or device, such as, but not limited to, a document, presentation, or a participant's desktop, that is being shared or shown to all participants of the videoconference. For instance, in one embodiment, video conferencing eyewear apparatus 102 may include a software application for enabling real-time collaboration on documents, presentations, or even remote desktop control, between all parties of the videoconference. If the process determines that shared data is received, the process, at step 416, displays the shared material on a second display of video conferencing eyewear apparatus 102. The process continues to process the incoming video, audio, and shared material until a determination is made, at step 418, that the videoconference has terminated.

However, in one embodiment, if the process determines, at step 408, that the videoconference is between three or more remote parties, the process may, at step 420, monitor the audio feed to determine a speaking party. In response to determining the speaking party, the process, at step 422, presents the corresponding video associated with the speaking party on a display unit of video conferencing eyewear apparatus 102. Additionally, the process, at step 424, may determine whether shared data is received. If the process determines that shared data is received, the process, at step 428, displays the shared material on a second display of video conferencing eyewear apparatus 102. However, in one embodiment, if the process does not receive shared data, the process may generate a video composite of the remaining videoconference participants (i.e., the currently nonspeaking participants) at step 430, and present the composite video image on the second display at step 432. In this embodiment, the process continues to process the incoming video, audio, and shared material and dynamically updates the displaying of the video associated with a speaking party until a determination is made, at step 428, that the videoconference has terminated.

Accordingly, the disclosed embodiments provide, among other things, an all-in-one solution for enabling a user to participate in a videoconference. As will be appreciated by one skilled in the art, certain aspects of the disclosed embodiments may be embodied as an apparatus or method. In addition, certain components of the disclosed embodiments may be implemented entirely with hardware or as a software embodiment (including firmware, resident software, microcode, etc.) or an embodiment combining software and hardware aspects. Furthermore, the disclosed embodiments may take the form of a computer program product embodied in any tangible medium of expression having computer-usable program code embodied in the medium.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A video conferencing eyewear apparatus comprising:
    a network interface for receiving a data stream from a video conference server, the data stream including video and audio associated with a first party, and a shared presentation;
    a data storage component that stores computer executable instructions; and
    a processor that executes the computer executable instructions to:
    display the video on a first display of the video conferencing eyewear apparatus;
    display the shared presentation on a second display of the video conferencing eyewear apparatus; and
    output the audio to an audio output component of the video conferencing eyewear apparatus.

2. The video conferencing eyewear apparatus of claim 1, wherein the first display and the second display are portions of one display.

3. The video conferencing eyewear apparatus of claim 1, wherein the data stream further includes a second video and second audio associated with a second party.

4. The video conferencing eyewear apparatus of claim 3, further comprising an audio detection component for determining whether the first party or the second party is currently speaking and responsive to identifying a speaking party, the processor executes computer executable instructions to display a corresponding video image associated with the speaking party on the first display of the video conferencing eyewear apparatus.

5. The video conferencing eyewear apparatus of claim 1, further comprising a camera for capturing outgoing video from a user, and wherein the network interface transmits the outgoing video to the video conference server.

6. The video conferencing eyewear apparatus of claim 1, further comprising a mouse component for maneuvering a mouse pointer on a display of the video conferencing eyewear apparatus.

7. The video conferencing eyewear apparatus of claim 1, further comprising a power port for receiving a power plug to recharge an internal power source of the video conferencing eyewear apparatus.

8. The video conferencing eyewear apparatus of claim 1, further comprising a connection port for interfacing with a mobile device for providing keyboard entry.

9. The video conferencing eyewear apparatus of claim 1, further comprising a connection port for interfacing with a mobile device for utilizing a camera of the mobile device to capture video images that are transmitted to the first party.

10. The video conferencing eyewear apparatus of claim 1, wherein the data storage component further stores user-generated audio files.

11. The video conferencing eyewear apparatus of claim 1, wherein the processor executes the computer executable instructions to display Internet content in a web browser on the second display.

12. A method for participating in a videoconference, the method comprising:
    receiving, at a video conferencing eyewear apparatus, audio and video data corresponding to a plurality of participants of the videoconference;
    monitoring the audio to determine a currently speaking participant of the videoconference;

identifying the video data corresponding to the audio of the currently speaking participant of the video conference;

displaying the identified video data; and displaying a composite video image of currently nonspeaking participants of the videoconference on a second display of the video conferencing eyewear apparatus.

13. The method of claim 12, further comprising displaying shared data on a second display of the video conferencing eyewear apparatus.

14. The method of claim 12, further comprising displaying a web browser on a second display of the video conferencing eyewear apparatus for enabling a user of the video conferencing eyewear apparatus to retrieve data from the Internet.

15. The method of claim 12, further comprising recording the videoconference to a data storage device.

16. The method of claim 12, further comprising:

determining at least a first portion of the video data to display on a first display of the video conferencing eyewear apparatus;

determining at least a second portion of the video data to display on a second display of the video conferencing eyewear apparatus; and displaying the first and second portions on the first and second displays.

17. The method of claim 16, wherein the displayed first portion and the second portion of the video data present a combined panoramic view image of the currently speaking participant to a user of the video conferencing eyewear apparatus.

18. A computer program product comprising a computer usable medium having a computer readable program code embodied therein, said computer readable program code comprising instructions to:

receive, at a video conferencing eyewear apparatus, audio and video data corresponding to a plurality of participants of a videoconference;

monitor the audio to determine a currently speaking participant of the videoconference;

display the video data corresponding to the audio of the currently speaking participant of the videoconference in a display of the video conferencing eyewear apparatus; and display a composite video image of currently nonspeaking participants of the videoconference on a second display of the video conferencing eyewear apparatus.

* * * * *